(12) United States Patent
Parrillo et al.

(10) Patent No.: US 6,860,966 B2
(45) Date of Patent: Mar. 1, 2005

(54) METHOD FOR ISOLATING POLYPHENYLENE ETHER POLYMER RESINS FROM SOLUTION

(75) Inventors: David Parrillo, Schenectady, NY (US); Probjot Singh, Delmar, NY (US)

(73) Assignee: General Electric, Pittsfield, MA (US)

( * ) Notice: Subject to any disclaimer, the term of this patent is extended or adjusted under 35 U.S.C. 154(b) by 519 days.

(21) Appl. No.: 10/005,934

(22) Filed: Nov. 12, 2001

(65) Prior Publication Data

US 2003/0111186 A1 Jun. 19, 2003

(51) Int. Cl.$^7$ ............................................. B01D 1/22
(52) U.S. Cl. ........................ 159/49; 159/6.2; 159/9.1; 203/89; 202/236; 202/238; 528/217
(58) Field of Search ...................... 159/6.2, 49, 9.1; 203/89; 202/238, 236; 528/21

(56) References Cited

U.S. PATENT DOCUMENTS

| | | |
|---|---|---|
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,914,266 A | 10/1975 | Hay |
| 4,028,341 A | 6/1977 | Hay |
| 4,065,346 A | 12/1977 | Evkin et al. |
| 4,692,482 A | 9/1987 | Lohrengel |
| 4,806,297 A | 2/1989 | Brown et al. |
| 4,806,602 A | 2/1989 | White et al. |
| 4,935,472 A | 6/1990 | Brown et al. |
| 5,084,134 A | 1/1992 | Mattiussi et al. |
| 5,256,250 A | 10/1993 | Pelzer |
| 5,419,810 A | 5/1995 | Van Der Piepen et al. |
| 5,573,635 A | 11/1996 | Van Der Piepen |
| 5,837,096 A | 11/1998 | Fagerlind et al. |
| 6,429,277 B1 * | 8/2002 | Braat et al. .................. 528/217 |
| 6,576,700 B2 * | 6/2003 | Patel .......................... 524/508 |

FOREIGN PATENT DOCUMENTS

| | | |
|---|---|---|
| CA | 1063761 | 9/1979 |
| EP | 0328902 A1 | 8/1989 |

OTHER PUBLICATIONS

International Search Report; International Application No. PCT/US 02/33240; International Filing dated: Oct. 15, 2002; Date of Mailing: Mar. 29, 2004 (6 pages).
Polymer Devolatilization, Ed. Ramon J. Albalak, Marcel Dekker Inc. p231 (1996).
Plastics Engineering "An Overview of Devolatilizers" by Pradip S. Mehta Hoechst Celanese Corp., Bishop TX, pp. 190 to 258.

* cited by examiner

*Primary Examiner*—N. Bhat (57) ABSTRACT

A method of removing substantially all solvent from a solution containing a polyphenylene ether polymer resin with little by-product formation (less than 250 ppm) is provided. The method employs a wiped thin film evaporator with a cylindrical heating chamber operating under conditions that satisfy the relationships defined by Equations I and II.

$$5.3*10^{24}RL\delta \exp^{(-24123/T)}/m < C \qquad \text{I}$$

$$100-(4960AP/Tm) < C \qquad \text{II;}$$

Yields are maximized wherein values for feed rate (m) and percent solids (C) are selected to provide a maximum value for the output, Q, determined from the equation m*C=Q and the melt viscosity of the polyphenylene ether product is less than 50,000 centipoise at the operating temperature of the cylindrical heating chamber.

16 Claims, 5 Drawing Sheets

METHOD FOR ISOLATING POLYPHENYLENE ETHER POLYMER RESINS FROM SOLUTION

CROSS-REFERENCE TO RELATED APPLICATIONS

Not applicable.

FEDERALLY SPONSORED RESEARCH

Not applicable.

BACKGROUND OF THE INVENTION

1. Field of the Invention

This invention relates to methods for isolating polyphenylene ether polymer resins from solution in a single pass from a wiped thin-film evaporator.

2. Brief Description of Related Art

Methods for removing organic solvents from thermoplastic resins using wiped thin film evaporators are disclosed in U.S. Pat. Nos. 5,419,810, 5,573,635, 4,065,346 and 5,256,250. It would be desirable to operate the device under high temperature conditions, which removes substantially all solvent from polyphenylene ether polymer resins in a single pass. This is not practical where the heat necessary to achieve such a result can pyrolize or thermally decompose the polyphenylene ether polymers, forming volatile by-products as well as non-volatile by-products. The formation of such by-products reduces the yield and/or product quality.

It is desirable to provide a method which allows for polyphenylene ether polymer resins to be isolated from solution and substantially free of solvents in a single pass of wiped thin film evaporator without significant degradation of the polyphenylene ether polymer resins. It is also desirable to maximize the throughput of wiped thin film evaporators operating under conditions which remove substantially all organic solvents from a solution of polyphenylene ether polymer resins without the significant degradation of the polyphenylene ether polymer resins.

SUMMARY OF THE INVENTION

The present invention provides a method of removing solvent from a solution of a polyphenylene ether polymer resin within a wiped thin film evaporator to isolate the polyphenylene ether polymer resin. This method comprises:

a) feeding a solution comprising at least one organic solvent and a polyphenylene ether polymer resin into a wiped thin film evaporator having a cylindrical heating chamber, b) forming a film of said solution on the wall of said cylindrical heating chamber, and c) heating said film in the cylindrical heating chamber of said a wiped thin film evaporator operating under conditions of pressure, temperature, feed rate and solution solids concentration which satisfy two rate models.

One model defines a rate of by-product formation, the other model defines the rate of material exiting the wiped thin film evaporator, i.e. the vapor velocity. Equations I and II below are examples of these rate models.

$$5.3 * 10^{24} RL\delta \exp(-24123/T)/m < C \quad \text{I}$$

$$100 - (4960AP/Tm) < C \quad \text{II}$$

wherein T is the operating temperature of the cylindrical heating chamber within the wiped thin film evaporator in absolute temperature (K);

R is the radius of the cylindrical heating chamber within the wiped thin film evaporator in ft;

L is the length of the cylindrical heating chamber within the wiped thin film evaporator in ft;

$\delta$ is the thickness of the thin film formed on the wall of the cylindrical heating chamber in ft;

P is the operating pressure of the cylindrical heating chamber within the wiped thin film evaporator in absolute pressure (mmHg);

A is the cross-sectional area of the cylindrical heating chamber within the wiped thin film evaporator in $ft^2$;

m is the feed rate of the solution of polyphenylene ether polymer resin into the heating chamber within the wiped thin film evaporator in lb/hr; and C is the solids concentration of the solution of polyphenylene ether polymer resin in wt % solids.

The temperature T is at least above the melting temperature of the polyphenylene ether polymers within the solution and preferably at a value that the viscosity of the molten polymer at the operating temperature is less than 50,000 cP. in order to achieve the desired heat transfer rate and maintain flow through the wiped thin film evaporator as the solvent is removed. Operating under the conditions set forth in Equation II will ensure that substantially all of the solvent is removed from the solution of polyphenylene ether resin at a low vapor velocity so as to minimize the entrainment of the liquid droplets in the vapor stream. Preferably, the solvent content is reduced to less than 1 wt %, preferably less than 0.5 wt %, and more preferably less than 0.2 wt % in a single pass at a vapor velocity below 1.5 ft/s. Operating under the conditions set forth in Equation I will ensure that the production of decomposition by-products is low. Preferably, less than 250 ppm decomposition by-products are generated while the solvent is removed from the solution of polyphenylene ether polymer resin. One of skill in this art would expect to need to utilize multiple stages, i.e. more than a single-pass, to achieve such low levels of solvent in the polyphenylene ether resin. Additionally, it is unexpected that such low levels of decomposition products could be achieved while operating within the parameters as provided by the present invention. Conventional teachings in this art would predict the need to have extremely high vacuum combined with high temperatures and low throughput rates to achieve the desired very low residual solvent levels.

In further preferred embodiments, the conditions for the removal of the solvent are such that the wt % solids of the solution of heat sensitive thermoplastic resin, C, falls within the range of 25 to 80 wt %. Solution concentrations greater than 80 wt % solids are typically difficult to handle due to high viscosity and wiped thin film evaporators do not provide the most efficient means for removing solvent from solutions having a solids concentration less than 25 wt % in that the volume of volatilized solvent is very high and the product rate per hour is very low. Concentration of the solution to at least 25 wt % solids before use of a wiped thin film evaporator is preferred.

Consistent with the upper limit of 80 wt % on the solids concentration of the solution is a limitation on the melt viscosity of the isolated polyphenylene ether (100 wt %) at the operating temperature of the thin film evaporator. The melt viscosity of 100 wt % polyphenylene ether is preferably below 50,000 centipoise at the operating temperature of the thin film evaporation to obtain desired evaporation efficiency. Isolating a polyphenylene ether at a higher viscosity can be accomplished but the evaporation efficiency drops as the product viscosity increases as reported by Pradip S. Mehta in Polymer Revolatilization, Ed. Ramon J. Albalak, Marcel Dekker Inc. p231 (1996).

DETAILED DESCRIPTION OF THE INVENTION

The methods of this invention unexpectedly serve to produce high quality polyphenylene ether resin product efficiently by operating under the conditions that satisfy both a rate model with respect to the formation of by-products and a model that defines the rate of material exiting the separation equipment, i.e. the vapor velocity. For example, operating a wiped thin film evaporator under conditions that satisfy both Equations I and II unexpectedly provides a polyphenylene ether polymer resin product having less than 250 ppm, preferably less than 100 ppm by-products from decomposition, which is substantially free of solvent (less than about 1 wt. % ppm of residual solvent) in one pass at a low vapor velocity, preferably below 1.5 ft/s (to minimize the entrainment of the liquid droplets). To simplify material handling, the solids content of the solution feed, C, is preferably maintained within the range of 25 to 80 wt %.

The equipment used to perform the methods of the present invention are preferably wiped thin film evaporators where a film is continuously wiped on a heated surface such as disclosed in U.S. Pat. Nos. 4,065,346, 5,419,810 and 5,256,250. These devices have a heated cylindrical chamber with wiper elements rotating within the chamber to form and maintain the thin film.

The methods of the present invention are well suited for use with polymer solutions containing polyphenylene ether polymer resins. Such resins undergo degradation at temperatures above their melting point such that some product may be lost to pyrolysis or thermal decomposition when removing all of the solvent in one pass through a wiped thin film evaporator. The polyphenylene ether polymer resins suitable for use in the methods of this invention have an intrinsic viscosity of below 0.50 dl/g in chloroform at 25° C. These suitable polyphenylene ether polymer resins include both homopolymers and copolymers. Preferred polyphenylene ether resins have an intrinsic viscosity that ranges from 0.08 dl/g to 0.42 dl/g, as measured in chloroform at 25° C. Polyphenylene ether resins with an intrinsic viscosity of about 0.30 dl/g generally have more than 50 repeating units of formula I below, a number average molecular weight within the range of 3,000 to 40,000 and a weight average molecular weight in the range of 20,000 to 80,000 as determined by gel permeation chromatography. Of particular interest are methods of this invention which remove solvents from polyphenylene ether resins having an intrinsic viscosity of below about 0.50 dl/g, preferably below about 0.25 dl/g, more preferably below 0.20 dl/g and most preferably between about 0.08 dl/g to 0.16 dl/g, as measured in chloroform at 25° C. The low molecular weight polyphenylene ether resins generally have a number average molecular weight within the range of about 1250 to about 10,000 and a weight average molecular weight within the range of about 2500 to about 25,000, as determined by gel permeation chromatography. These polyphenylene ether resins have significantly lower molecular weights and degrade when heated over extended periods.

The polyphenylene ether polymer resins suitable for use in the methods of this invention are typically prepared in solution by the oxidative coupling of at least one monohydroxy aromatic compound in the presence of a copper, manganese, or cobalt catalyst. These polyphenylene ether polymers comprise a plurality of aryloxy repeating units preferably with at least 10, more preferably with at least 20, and most preferably with at least 50 repeating units of the following formula:

I wherein in each of said units independently, each $Q^1$ is independently halogen, alkyl (preferably primary or secondary lower alkyl containing up to 7 carbon atoms), aryl (preferably phenyl), halohydrocarbon groups (preferably haloalkyl) having at least two carbons between the halogen atoms and the phenyl nucleus of Formula I, aminoalkyl, hydrocarbonoxy or halohydrocarbonoxy wherein at least two carbon atoms separate the halogen and oxygen atoms and at least two carbon atoms separate the halogen atoms and the phenyl nucleus of Formula I.

Each $Q^2$ is independently hydrogen, halogen, alkyl (preferably primary or secondary lower alkyl up to 7 carbon atoms), aryl (preferably phenyl), halohydrocarbon (preferably haloalkyl) having at least two carbon atoms between the halogen atoms and the phenyl nucleus of Formula I, hydrocarbonoxy groups or halohydrocarbonoxy groups wherein at least two carbon atoms separate the halogen and oxygen atoms and at least two carbon atoms separate the halogen atoms from the phenyl nucleus of Formula I. Each of $Q^1$ and $Q^2$ can suitably contain up to about 12 carbon atoms and most often, each $Q^1$ is an alkyl or phenyl, especially $C_1$–$C_4$ alkyl and each $Q^2$ is hydrogen.

The term "polyphenylene ether resin," as used in the specification and claims herein, includes:
  unsubstituted polyphenylene ether polymers;
  substituted polyphenylene ether polymers, wherein the aromatic ring is substituted;
  polyphenylene ether copolymers;
  polyphenylene ether graft polymers containing grafted moieties such as vinyl monomers, polystyrenes and elastomers;
  polyphenylene ether coupled polymers, wherein coupling agents, e.g., polycarbonates, form high molecular weight polymers;

functionalized polyphenylene ethers with one or more reactive groups, e.g. amino, carboxylic acid, carboxylic ester, hydroxyl, epoxy, and anhydride groups, and end-capped polyphenylene ether polymers with functional end groups such as those reactive moieties previously described.

It will be apparent to those skilled in the art from the foregoing that the polyphenylene ether polymers contemplated for use in the methods of the present invention include all of those presently known, irrespective of the variations in structural units.

Specific polyphenylene ether polymers which can be used in the methods of the present invention include but are not limited to poly(2,6-dimethyl-1,4-phenylene ether);
poly(2,6-dimethyl-1,4-phenylene ether-co-2,3,6-trimethyl-1,4-phenylene ether);
poly(2,3,6-trimethyl-1,4-phenylene ether);
poly(2,6-diethyl-1,4-phenylene ether);
poly(2-methyl-6-propyl-1,4-phenylene ether);
poly(2,6-dipropyl-1,4-phenylene ether);
poly(2-ethyl-6-propyl-1,4-phenylene ether);
poly(2,6-dilauryl-1,4-phenylene ether);
poly(2,6-diphenyl-1,4-phenylene ether);
poly(2,6-dimethoxy-1,4 phenylene ether);
poly(2,6-diethoxy-1,4-phenylene ether);
poly(2-methoxy-6-ethoxy-1,4-phenylene ether);
poly(2-ethyl-6-stearyloxy-1,4-phenylene ether);
poly(2,6-dichloro-1,4-phenylene ether);
poly(2-methyl-6-phenyl-1,4-phenylene ether);
poly(2-ethoxy-1,4-phenylene ether);
poly(2-chloro-1,4-phenylene ether);
poly(2,6-dibromo-1,4-phenylene ether);
poly(3-bromo-2,6-dimethyl-1,4-phenylene ether); mixtures thereof, and the like.

The methods of this invention provide effective results with polyphenylene ether resins which are copolymers of 2,6-dimethyl-1,4-phenylene ether units (from 2,6-xylenol) and 2,3,6-trimethyl-1,4-phenylene ether units (from 2,3,6-trimethylphenol) which typically form fine particulates in the reaction medium.

Specific examples of suitable polyphenylene ether resins and methods for preparing these polyphenylene ether resins are set forth in U.S. Pat. Nos. 3,306,874, 3,306,875, 3,914,266 and 4,028,341 (Hay); U.S. Pat. Nos. 3,257,357 and 3,257,358 (Stamatoff); U.S. Pat. Nos. 4,935,472 and 4,806,297 (S. B. Brown et al.); and U.S. Pat. No. 4,806,602 (White et al.).

The liquid carrier component of the solution of polyphenylene ether polymer resin can vary widely and is typically an organic solvent having a vaporization temperature under 250 C, preferably below 200 C. Although preferred liquid carriers primarily comprise one or more organic solvents, suitable liquid carriers include aqueous based solvents. The liquid carrier may either dissolve, emulsify or disperse the polyphenylene ether polymer therein. Suitable organic solvents include those well known in the art such as aliphatic, cyclic and aromatic hydrocarbons, including heterocyclic compounds, heteroaryl compounds and halosubstituted aliphatic, cyclic and aromatic hydrocarbons up to per-halo, as well as aliphatic, cyclic and aromatic aldehydes, alcohols, ethers and ketones, and halo substituted derivatives thereof. The term "aromatic", as used herein includes alkyaromatic compounds. More specific examples include hexane, pentane, heptane, carbon tetraflouride, isopropyl alcohol, n-octane, dodecane, pyridene, trichloromethane, dichloromethane, n-butyl alcohol, t-butyl alcohol, isobutylalcohol, methylbutyl ketone, diethylether, diethylene glycol, dimethyl ketone, benzene, toluene, xylene, resorcinol, hydroquinone, tetrahydrofuran, and the like. Other solvents suitable for the method of this invention include chlorinated and brominated hydrocarbons having from 1 to 20 carbon atoms such as methylene chloride, 1,1,2,2-tetrachloroethane, 1,2-dichloroethylene, chlorobenzene, chloroform, dichlorobenzene and 1,1,2-trichloroethane. In preferred embodiments, the solvent is the reaction medium in which the polyphenylene ether polymer is produced.

The solution of polyphenylene ether resin may contain solids of the resin dispersed or emulsified within the solvent. Solubilized resins may also be present with the emulsified or dispersed resins. Isolating a resin from a solution containing solids by the present invention may be preferred over other techniques such as filtration, where the solids are very fine and difficult to handle when isolated by filtration.

In performing the method of this invention, the wiped thin film evaporator is operated under temperatures, pressures and throughputs within conventional ranges for commercial equipment. For example, temperatures in the range of 100 C to 400 C more typically from about 200 C to 350 C are used. The pressure maintained in the wiped thin film evaporator, prior to the addition of the solution of polyphenylene ether polymer resin, can also range widely from pressures approaching total vacuum (about 10 mmHg) to 2 ATM. More typically, the pressure ranges from about 60 mmHg and above. The feed rate can also range widely and often depends on the size of the wiped thin film evaporator. Cylindrical units having a radius of about ⅓ foot and a length of about 5 feet will permit feed rates of up to 300 lb/hr to be achieved. Where substantially complete solvent removal from a solution containing a polyphenylene ether resin is desired, feed rates significantly below 300 lb/hr may be necessary. Each of these variables can be adjusted to satisfy both models, such as the relationships defined by Equations I and II discussed above. The concentration (wt % solids) of polyphenylene ether within the solution can vary widely and can be adjusted as is necessary to satisfy the relationships for Equations I and II discussed above. However, the concentration of solids within a solution is typically determined by a synthesis method or subsequent processing steps in preparing the polymer. Therefore, the solids concentration of the solution to be treated may be left unchanged and other variables adjusted to satisfy both models, such as the relationships for Equations I and II discussed above. There are limits to varying the concentration of the solution. It is preferable to adjust the solids concentration of the solution to be treated to within the range of 25 wt % to 80 wt % solids. Providing a solids content below 80 wt % simplifies handling of the solution within the wiped thin film evaporator and similar equipment in that solutions with higher solids contents are very viscous and difficult to handle at ambient temperature. Similarly, solutions having a solids content below 25 wt % unexpectedly do not provide for effective use of the separation equipment, requiring significant expenditures of energy to handle large volumes of input with little output. Solvent solutions, which contain fewer than 25 wt % of solids, such as an oxidative coupling reaction medium, can be concentrated more efficiently by known techniques such as that described in U.S. Pat. No. 4,692,482 or by heating the solution to a temperature above 50 C, optionally with the application of vacuum. These conditions are mild as compared to those employed within a wiped thin film evaporator.

Figure 1:
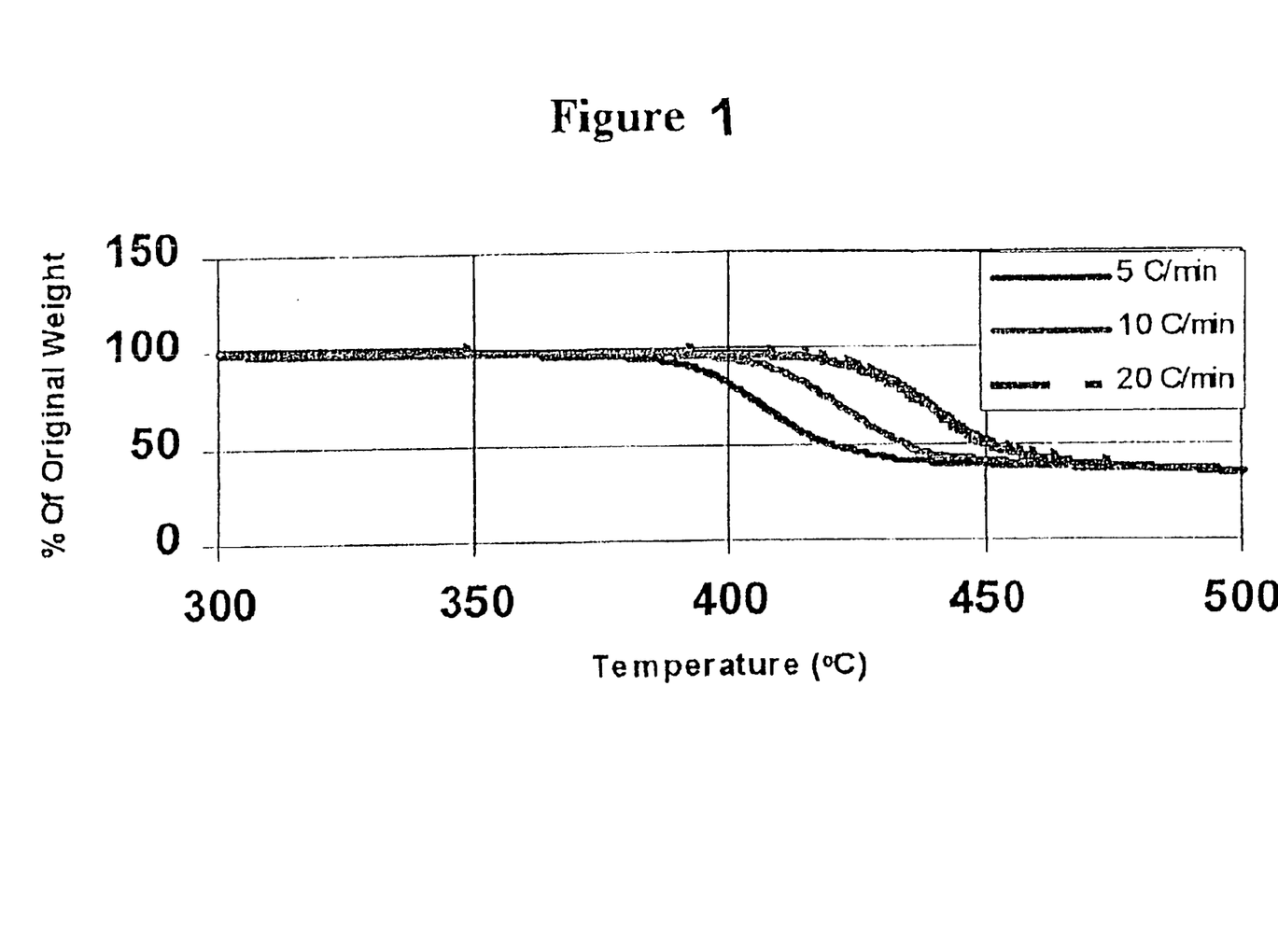
FIG. 1 is a graph showing the loss in weight of a polyphenylene ether resin with increasing temperature for 3 different heating rates.
Figure 2:
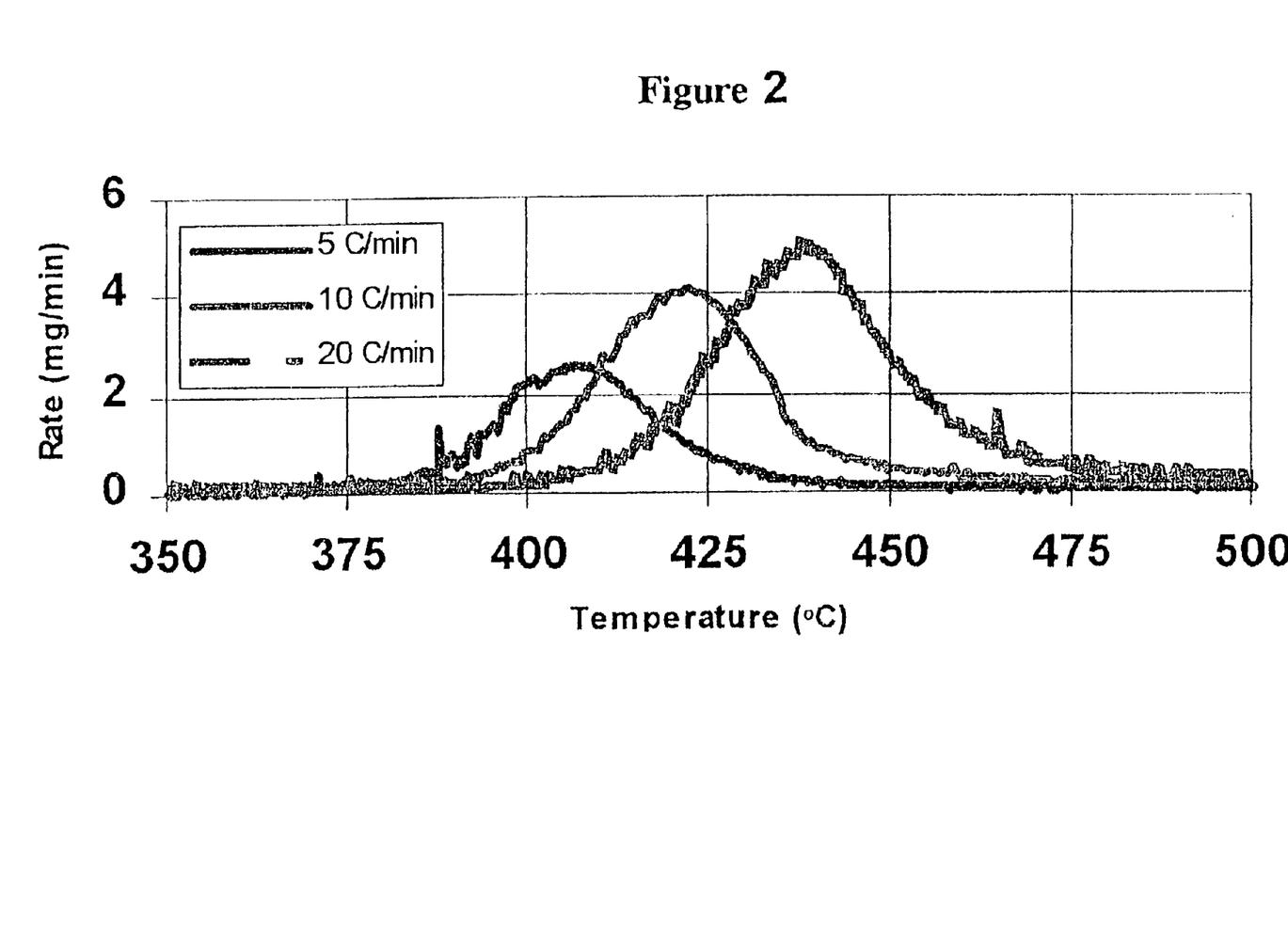
FIG. 2 is a graph showing the rate of weight loss of a polyphenylene ether resin with increasing temperature for 3 different heating rates.

To obtain a kinetic model of the rate of by-product formation in the polyphenylene ether polymer such as that of Equation I, the rate of by-product formation in the polyphenylene ether polymer is determined at varying heat rates, i.e. at least two or more preselected heating rates. This can be accomplished by measuring the weight of a sample of polyphenylene ether polymer with increasing temperature at different heating rates. For example, FIG. 1 illustrates the loss of polyphenylene ether polymer (0.12 dl/g) when heated under nitrogen from a temperature of 300 to 500 C at rates of 5 C per minute, 10 C per minute and 20 C per minute. From these values, the rate of weight loss (by-product formation) with increasing temperature is determined for the different heat rates (5 C per minute, 10 C per minute, and 20 C per minute). FIG. 2 shows values for the rate of weight loss plotted against increasing temperature at different heat rates from the data given in FIG. 1. From this plot the temperature at the maximum rate of degradation can be determined for a given heat rate. These values are then plotted in the relationship:

$$\ln (T^2/k) \text{ versus } 1/T.$$

Figure 3:
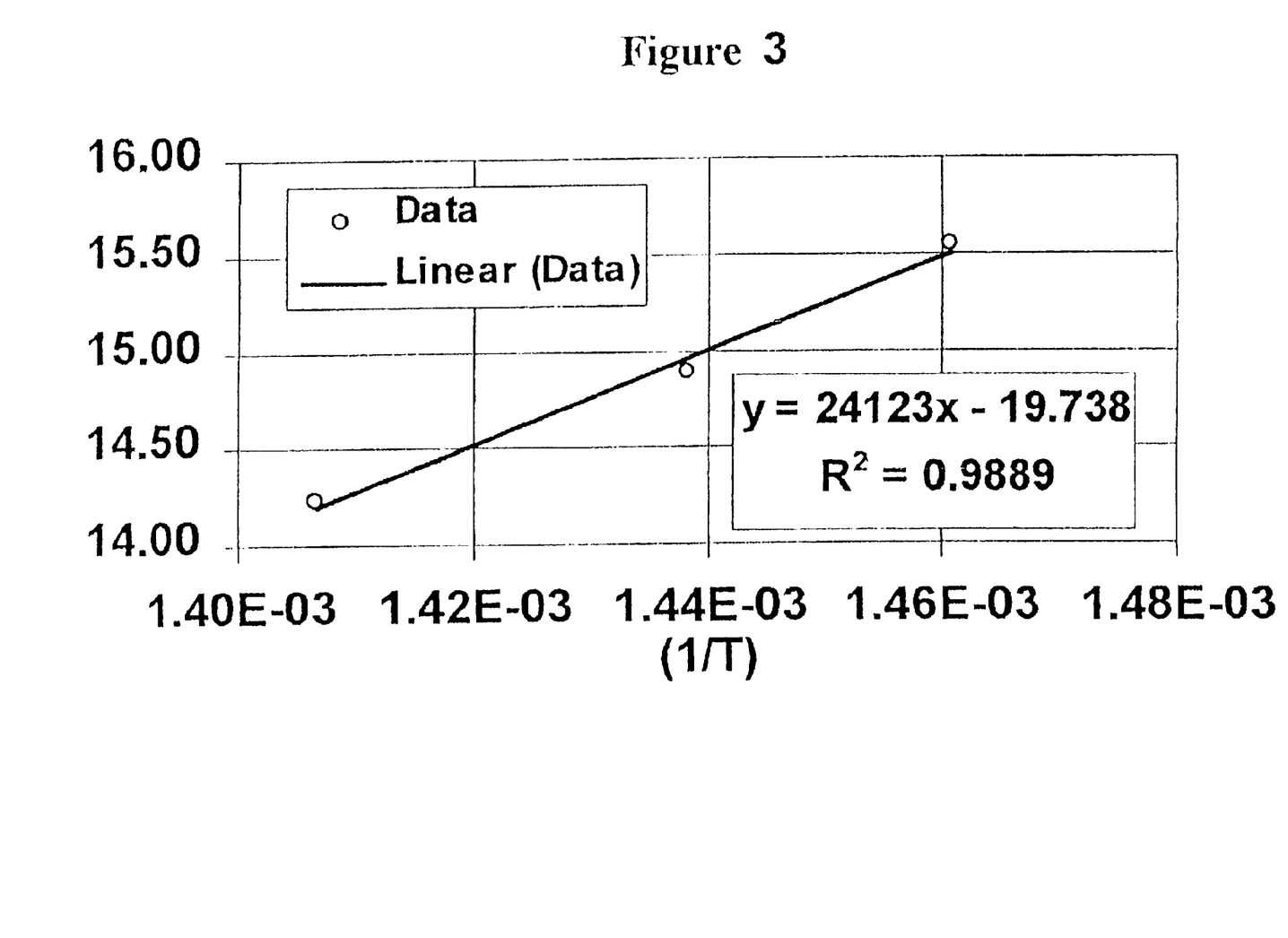
FIG. 3 is a plot of the linear relationship y=24123 X−19.738.

The three peaks in FIG. 2 define three temperatures for the maximum rate of degradation for a given heat rate which are plotted in FIG. 3 (see disclosure). The plot of FIG. 3 defines the linear relationship: Y=24123X−19.738. The slope, S, and intercept, I, from this relationship are used to determine the activation energy, $E_a$, and exponent factor of a first order kinetic rate equation, $-k=Ae^{-(Ea/Rt)}$ where k is the first order rate constant, A is the frequency factor (A=7.18×10$^{12}$ 1/s), R is the gas constant and T is the absolute temperature. The kinetic model of the rate of by-product formation, such as that defined by Equation I for wiped thin film evaporators, is extrapolated from this first order kinetic rate equation after determining the activation energy (200 kJ/mol) and exponent factor. Methods other than plot of FIG. 3 can be used to determine the activation energy.

For a given equipment, R, L, A, and δ are typically constant and the solids concentration, C, feed rate (m), pressure (P) and temperature (T) that satisfy Equation I are selected. One to three of the solids concentration, (C), feed rate (m), pressure (P) and temperature (T) can be predetermined, i.e. constant. The temperature is at least above the melting temperature of the heat sensitive thermoplastic resin to maintain flow through the wiped thin film evaporator and preferably is at a value that the melt viscosity of the molten polymer is less than 50,000 cp. to achieve the desired heat transfer rate. For polyphenylene ether resins with a glass transition temperature value (Tg) of up to 205° C., operating temperatures of 210 C to 315 C are preferred. For a given temperature (T), solids concentration (C) and pressure (P), the feed rate (m) is maximized while still satisfying Equation I. This will minimize degradation. Preferably degradation is kept below 250 ppm, most preferably less than 100 ppm by products. Feed rates higher than those dictated by Equation I can be used but can result in high levels of residual solvent. Feed rates lower than those dictated by Equation I will result in excess degradation if other parameters are not modified to compensate for the reduction in feed rate.

To ensure that the polyphenylene ether polymer is isolated without unacceptable loss of product, the process conditions are selected to provide a maximum vapor velocity. For the wiped thin film evaporator, the process conditions preferably provide for removal of substantially all solvent (<200 ppm) and isolation of polyphenylene ether polymer in a single pass through the equipment. Process conditions that satisfy the relationship of Equation II below can provide such performance.

$$C > 100 - (4960 * AP/Tm) \quad \text{II}$$

For a conventional wiped thin film evaporator, the cross-sectional area of the device (A) is typically predefined. Pressure (P) and Temperature (T) and either the solids concentration (C) or feed rate (m) are typically predetermined as well. The feed rate (m) or solids concentration (C) is then selected so as to satisfy the relationship of Equation II. To maximize the output, the highest value for the feed rate or solids concentration is selected. Lowering the feed rate (m) for a given solids content and other process conditions will increase residence times and decrease vapor velocity. Increasing the feed rate results in fewer by-products but these increases are limited by the need to isolate the polymer resin from solvent at a low vapor velocity, as prescribed by Equation II.

When operating at preselected process conditions, a number of combinations of values for solids content (C) and feed rate (m) will unexpectedly satisfy Equations I and II and provide substantially solvent-free polyphenylene ether resin (<1 wt. % solvent) with substantially no by-product (<250 ppm by-products). However simply satisfying the relationship of Equations I and II does not provide maximum output for the wiped thin film evaporator. To maximize the output of a wiped thin film evaporator, values for solids content, C, and feed rate (m) are considered. The maximum output will be achieved from a pair of values for feed rate (m) and solids content (C) that provide a maximum value for Q, defined by the equation: m * C=Q, preferably with a solids content of from 25–80 wt %. The values for P, T, M and C can be selected to provide a value for the output. Q, of 90% to 100% of the maximum, as determined from this equation. Optionally, the valeus P and T can be constant and the values for m and C can be selected to provide a value for the output. Q, of 90—100% of the maximum permitted by Equations I and II.

In order that those skilled in the art will be better able to practice the invention, the following examples are given by way of illustration and not by way of limitation.

EXAMPLES

Solutions of low viscosity polyphenylene ether (nominal 0.12 IV dl/g, containing 7,000 ppm of residual toluene) and reagent grade toluene are made and held at 160 F in a stirred tank vessel. These solutions are treated in a wiped film evaporator, with an approximately 10 sq. ft. heat exchange area, an 8 inch diameter and a height of 5 ft. The base of the system includes a rotary lock and a positive displacement pump. The rotor speed is set at 375 rpm and the temperature is set at 500 F for all trials. The molten product is allowed to drool into product containers for later analysis.

Example 1

A polyphenylene ether solution prepared as described above and comprising 35% solids is fed into a wiped film evaporator at a rate of 230 lb/hr (80.5 lbs solids/hr). The pressure is maintained at 70 mm Hg. The product comprises over 99.7% solids and is recovered at a rate of 52 lb/hr. Yield=64%.

Example 2

A polyphenylene ether solution as used in Example 1 is passed through the same wiped film evaporator operating at the same pressure and temperature but at a higher feed rate of 280 lb/hr (98 lb solids/hr). The product comprises over 99.7% solids; however, the yield is dramatically less than 64% in that a significant amount of the polymer is lost going "over head" with the vapor stream. Therefore the yield cannot be determined.

Example 3

A polyphenylene ether solution prepared as described above and comprising 60 wt % solids is passed through the same wiped film evaporator as in Example 1 at 100 mmHg pressure. A feed rate of 230 lbs/hour provides 138 lbs solids/hr. The product comprises over 99.5% solids and is recovered at a rate of 92 lb/hr. Yield=66%.

Example 4

The same polyphenylene ether solution employed in Example 3 is fed through the same wiped film evaporator, operating at the same pressure and temperature but at a slower feed rate of 138 lb/hr (about 82.8 lb solids/hr). A product of over 99.8% solids is recovered at a rate of 66 lbs/hr. Yield=81%.

As seen from the high % solids of the recovered product, the variables in all four examples satisfy the relationship of Equation I. Example I did not satisfy the relationship of Equation II as is evident from the low yield. Example 2 with a higher feed rate is even further from satisfying the relationship of Equation II as is evident from the more significant loss of product. Example 3, with a higher solids content of 60 wt % and higher pressure, is closer to satisfying Equation II than Example I and provides a higher yield. Example 4 with the reduced feed rate of 138 lbs/hr comes the closest to satisfying Equation II, as is evidenced by the highest yield.

Example 5

To further illustrate the methods of this invention, parameters for a particular wiped thin film evaporator operating at a predetermined pressure (P), temperature (T) and film thickness (δ) have been inserted into Equations I and II to determine the optimum solids concentration (C) for a polyphenylene ether solution having an I.V. of 0.12 dl/g. With R=0.333 ft, L=5 ft, T=563° K, P=100 mmHg and δ=0.0033 ft, the calculation of C from Equations I and II, with varying values for feed rate, are given in Table I below.

TABLE I

| Feed rate lb/hr (m) | Decomp. (ppm) | Equation I | Equation II | Approximate range |
|---|---|---|---|---|
| 40 | 783 | 178.5 | 22.8 | — |
| 60 | 246 | 119.0 | 48.6 | 49–80% |
| 80 | 146 | 89.3 | 61.4 | 62–80% |
| 100 | 104 | 71.4 | 69.1 | 70–71% |
| 120 | 80 | 59.5 | 74.3 | — |
| 140 | 66 | 51.0 | 78.0 | — |
| 160 | 48 | 44.6 | 80.7 | — |
| 180 | 42 | 39.7 | 84.5 | — |
| 200 | 38 | 35.7 | 85.97 | — |

From Table I it is seen that feed rates of 120 lb/hr. and above will not satisfy Equations I and II since the values calculated for C from Equation II are greater than the values calculated from Equation I. A feed rate of 40 lb/hr results in high levels of decomposition products. At a feed rate of 60 lb/hr, a solution concentration in the range of about 49–80% can be used. At a feed rate of 80 lb/hr, a solution concentration in the range of about 62–80% can be used. At a feed rate of 100 lb/hr, a solution concentration in the range of about 70–71% can be used. Maximum output conditions fall between about 80 to about 100 lb/hr with a solids content in the range of 71 to 80 wt % since with a feed rate of 100 lb/hr@71% solids (m * C=Q), the output is 71 lb/hr and with a feed rate of 80 lb/hr@80% solids (m * C=Q), the output is 64 lb/hr.

Figure 4:
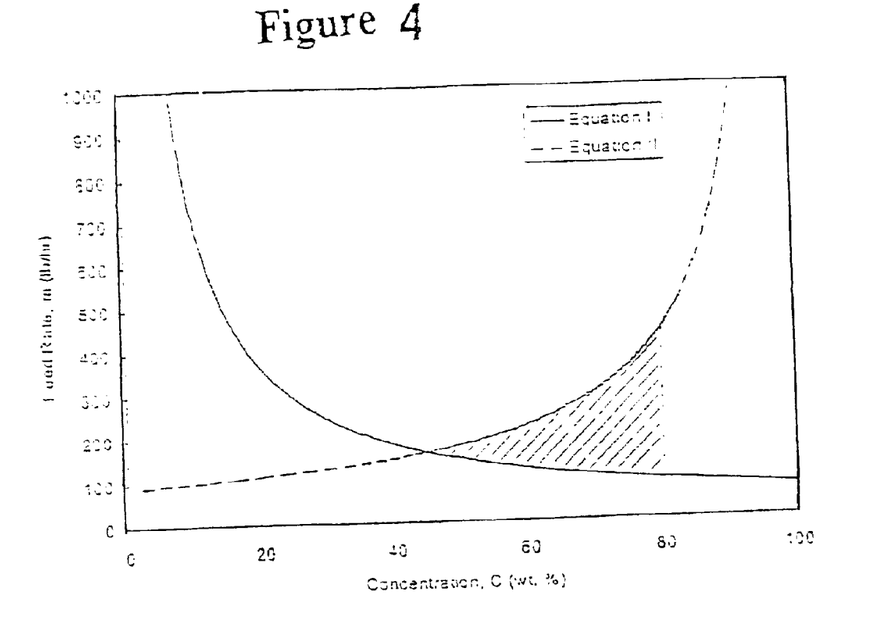
FIG. 4 is a plot of solutions for equations I and II at 563° K and p=100 mmHg with varying values for "m" and "C".

Equation I and Equation II are solved for the above conditions for the temperature and pressure and the solution is shown in FIG. 4.

The shaded space is the one that satisfies both equations at the same time along with the condition that the polymer concentration is not higher than 80%. Polymer solutions with a concentration lower than 44% can not be processed under these conditions. For a certain value of the polymer concentration, C, in order to maximize the throughput, it is desired to operate at the curve of Equation II.

Figure 5:
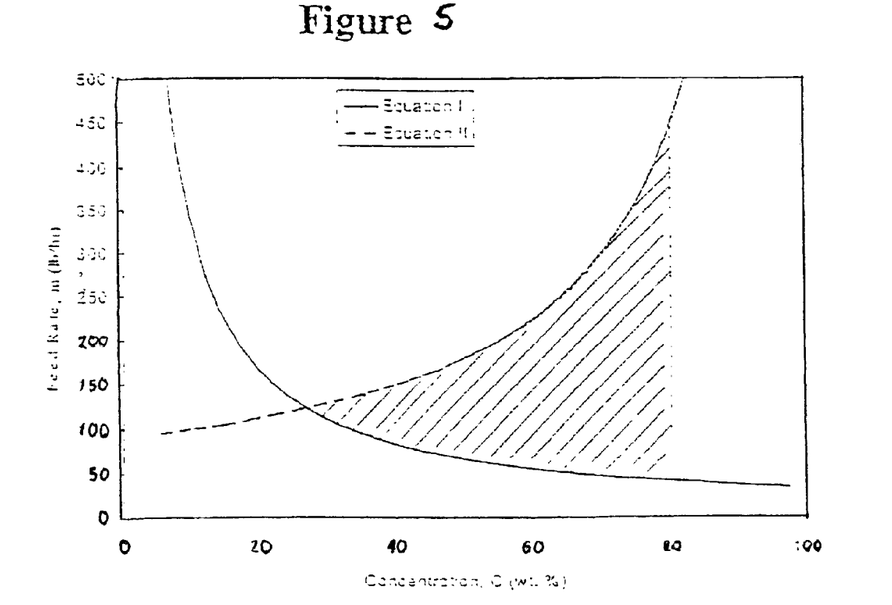
FIG. 5 is a plot of solutions for equations I and II at 553° K and p=100 mmHg with varying values for "m" and "C".

If the temperature is reduced from 563° K to 553° K, then the allowable operating space changes as shown in FIG. 5.

Under these conditions, the lower allowed polymer concentration, C, is 26% and the operating space is larger as compared to the case of 563° K.

The melt viscosity of polyphenylene ether as a function of intrinsic viscosity of the polymer and temperature was determined to obtain a guide to preferred operating temperatures for a thin film evaporator for a particular resin. Polymers having intrinsic viscosities of 0.09, 0.12, and 0.15 dl/g were synthesized. Rheological analysis showed that the viscosity of the molten polymer is a function of the shear rate and zero-shear viscosity was determined at various temperatures. The results, presented in Table 2, show variations in molten polymer viscosity as a function of intrinsic viscosity of the polymer and temperature.

TABLE 2

| Ex. No. | I.V. (dL/g) | Temperature (C.) | Zero-shear Viscosity (cp) |
|---|---|---|---|
| 1 | 0.09 | 210 | 294 |
| 2 | 0.09 | 220 | 128 |
| 3 | 0.09 | 230 | 58.2 |
| 4 | 0.09 | 240 | 31.8 |
| 5 | 0.09 | 250 | 20.8 |
| 6 | 0.09 | 260 | 14.4 |
| 7 | 0.12 | 210 | 4830 |
| 8 | 0.12 | 220 | 1280 |
| 9 | 0.12 | 230 | 448 |
| 10 | 0.12 | 240 | 178 |
| 11 | 0.12 | 250 | 81.3 |
| 12 | 0.12 | 260 | 42.6 |
| 13 | 0.15 | 210 | 23700 |
| 14 | 0.15 | 220 | 4920 |
| 15 | 0.15 | 230 | 1480 |
| 16 | 0.15 | 240 | 591 |
| 17 | 0.15 | 250 | 266 |
| 18 | 0.15 | 260 | 130 |

Using conventional regression techniques, the data were used to generate the equation (A):

$$\mu = 3.36 \times 10^{-17} e^{\left(\frac{18847 + 26878 \times IV}{272.1 + T}\right)} \tag{A}$$

where $\mu$ is the zero-shear viscosity of the polymer melt (expressed in cp), IV is the polymer intrinsic viscosity in chloroform at 25 C (expressed in dL/g), and T is the temperature (expressed in C) of the molten polymer. Equation (A) can be solved for temperature, T, with the value viscosity to be less than 50000 cp resulting in equation (B):

$$T \geq (115+552 \times IV) \tag{B}$$

Equation (B) suggests that in optimizing the efficiency of the evaporation process, the operating temperature of the wiped thin film evaporator should exceed a minimum value that is dependent on the I.V. of the polymer.

Figure 6:
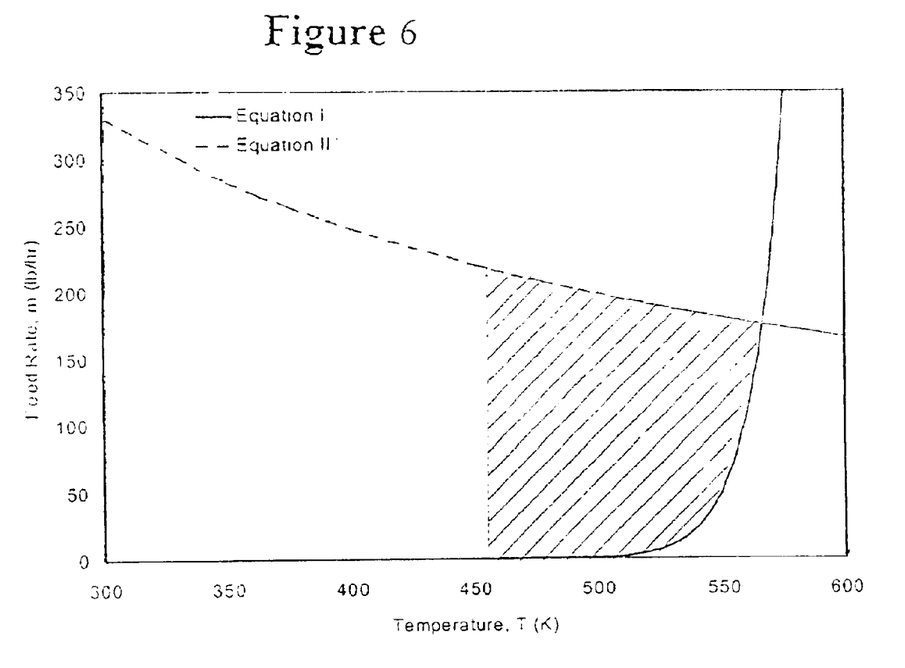
FIG. 6 is a plot of solutions for equations I and II at C=50% with varying temperature and feed ratio.

For the case of Example 5 where polymer concentration, C, is fixed at 50%, the following operating space for feed rate, m, and temperature, T, is calculated and shown in FIG. 6.

Again the shaded space in FIG. 6 is the operating space that satisfies both equations. This operating space shows that the desired temperature is lower than 565° K and in order to keep the melt viscosity of the polymer (0.12 dl/g) below 50,000 cp., the desired operating temperature is higher than 455° K (as calculated from Equation B) and to maximize the heat transfer rate it is desired to keep the temperature near 565° K.

The entire disclosure of all applications, patents and publications, cited herein are hereby incorporated by reference.

The preceding examples can be repeated with similar success by substituting the generically or specifically described reactants and/or operating conditions of this invention for those used in the examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for removing solvent from a solution of a polyphenylene ether polymer resin in a wiped thin film evaporator said method comprising:

feeding a solution comprising at least one organic solvent and a polyphenylene ether polymer resin into a wiped thin film evaporator having a heating chamber, forming a film of said solution on the wall of said heating chamber, and heating said film in the heating chamber of said wiped thin film evaporator operating under conditions for pressure, temperature, feed rate and solution solids concentration which satisfy two rate models, one model defines a rate of by-product formation of less than 250 ppm, the other model defines the vapor velocity of the material exiting the thin film evaporator of less than 1.5 ft/s.

2. A method as in claim 1 wherein the model defining a rate of by-product formation of less than 250 ppm is Equation I and the model defining a vapor velocity of less than 1.5 ft/s for the material exiting the wiped thin film evaporator is Equation II:

$$5.3 \ast 10^{24} RL\delta \exp^{(-24123/T)}/m < C \tag{I}$$

$$100-(4960AP/Tm) < C \tag{II;}$$

wherein

T is the operating temperature of the cylindrical heating chamber within the wiped thin film evaporator in absolute temperature (K);

R is the radius of the cylindrical heating chamber within the wiped thin film evaporator in ft;

L is the length of the cylindrical heating chamber within the wiped thin film evaporator in ft;

P is the operating pressure of the cylindrical heating chamber within the wiped thin film evaporator in absolute pressure (mmHg);

A is the cross-sectional area of the cylindrical heating chamber within the wiped thin film evaporator in $ft^2$;

δ is the thickness of the film of said solution on the wall of said cylindrical heating chamber in ft;

m is the feed rate of said solution of polyphenylene ether polymer resin into the cylindrical heating chamber within the wiped thin film evaporator in lb of solution/hr; and C is the solids concentration of said solution of polyphenylene ether polymer resin in wt % solids.

3. A method for removing solvent from a solution of a polyphenylene ether polymer resin in a wiped thin film evaporator said method comprising:

feeding a solution comprising at least one organic solvent and a polyphenylene ether polymer resin into a wiped thin film evaporator having a cylindrical heating chamber, forming a film of said solution on the wall of said cylindrical heating chamber, and heating said film on the wall of said cylindrical heating chamber of said wiped thin film evaporator operating under conditions for pressure, temperature, feed rate and solution solids concentration which satisfy the relationships defined by Equations I and II:

$$5.3 \ast 10^{24} RL\delta \exp^{(-24123/T)}/m < C \tag{I}$$

$$100-(4960AP/Tm) < C \tag{II;}$$

wherein

T is the operating temperature of the cylindrical heating chamber within the wiped thin film evaporator in absolute temperature (K);

R is the radius of the cylindrical heating chamber within the wiped thin film evaporator in ft;

L is the length of the cylindrical heating chamber within the wiped thin film evaporator in ft;

P is the operating pressure of the cylindrical heating chamber within the wiped thin film evaporator in absolute pressure (mmHg);

A is the cross-sectional area of the cylindrical heating chamber within the wiped thin film evaporator in $ft^2$;

δ is the thickness of the film of said solution on the wall of said cylindrical heating chamber in ft;

m is the feed rate of said solution of polyphenylene ether polymer resin into the cylindrical heating chamber within the wiped thin film evaporator in lb of solution/hr; and C is the solids concentration of said solution of polyphenylene ether polymer resin in wt % solids.

4. A method as in claim 3 where C has a value within the range of 25 to 80 wt %.

5. A method as in claim 4 where the melt viscosity of the polyphenylene ether polymer resin is less than 50,000 centipoise at the operating temperature, T, of the cylindrical heating chamber within the wiped thin film evaporator.

6. A method as in claim 4 where the operating temperature of the cylindrical heating chamber within the wiped thin film evaporator satisfies the equation $T \geq (115+552 \times IV)$, wherein IV is the intrinsic viscosity of the polyphenylene ether polymer resin in said solution.

7. A method as in claim 6 wherein the polyphenylene ether polymer resin within solution has an intrinsic viscosity of less than 0.25 dl/g in chloroform.

8. A method as in claim 7 which additionally comprises recovering a product of polyphenylene ether polymer resin from the heating chamber, said product of polyphenylene ether polymer resin comprising over 99.5% solids and fewer than 250 ppm formed by-products.

9. A method as in claim 8 wherein he values for R, L and A are constant for the wiped thin film evaporator employed, and the values for P, T, M and C are selected to provide a value for the output, Q, of 90% to 100% of the maximum, as determined from the equation m*C=Q.

10. A method as in claim 9 wherein the values P and T are constant and the values for m and C are selected to provide a value for the output, Q, of 90–100% of the maximum permitted by Equations I and II.

11. A method as in claim 9 wherein the value for C is predetermined and constant.

12. A method as in claim 11 wherein the values for P, I.V., and T are predetermined and constant.

13. A method as in claim 9 wherein the value for the feed rate m is predetermined and constant.

14. A method as in claim 13 wherein the values for P, I.V., and T are predetermined and constant.

15. A method as in claim 9 wherein the solution of polyphenylene ether resin is a reaction medium of a solution polymerization process in which a copolymer of 2,6-xylenol and 2,3,6-trimethylphenol is produced in a toluene solution.

16. A method as in claim 4 wherein the wiped thin film evaporator operates at a temperature in the range of 200 C to 350 C.

* * * * *